(12) United States Patent
Matsumoto et al.

(10) Patent No.: US 11,273,508 B2
(45) Date of Patent: Mar. 15, 2022

(54) ELECTRICAL DISCHARGE MACHINING ASSEMBLIES AND METHODS FOR USING THE SAME

(71) Applicant: GE-Hitachi Nuclear Energy Americas LLC, Wilmington, NC (US)

(72) Inventors: Jack T. Matsumoto, San Jose, CA (US); Mark D. Sumner, Wilmington, NC (US); Christopher M. Welsh, San Jose, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 448 days.

(21) Appl. No.: 16/237,640

(22) Filed: Dec. 31, 2018

(65) Prior Publication Data

US 2020/0206834 A1 Jul. 2, 2020

(51) Int. Cl.
*B23H 1/04* (2006.01)
*B23H 9/14* (2006.01)
*B23H 7/12* (2006.01)

(52) U.S. Cl.
CPC .............. *B23H 1/04* (2013.01); *B23H 7/12* (2013.01); *B23H 9/14* (2013.01)

(58) Field of Classification Search
CPC ... B23H 1/04; B23H 9/14; B23H 7/12; B23H 7/26; B23H 7/265
See application file for complete search history.

(56) References Cited

U.S. PATENT DOCUMENTS

| 3,125,664 | A | * | 3/1964 | Pfau | B23H 7/28 219/69.2 |
| 3,629,540 | A | * | 12/1971 | Altfeld | B23H 7/28 219/69.2 |
| 4,159,407 | A | * | 6/1979 | Wilkinson | B23H 1/00 204/224 M |

(Continued)

FOREIGN PATENT DOCUMENTS

| GB | 1094024 | * 12/1967 |
| JP | 06099314 A | * 4/1994 |

(Continued)

OTHER PUBLICATIONS

PRV, "Swedish Search Report" in corresponding SE application 1951482-7, dated Sep. 3,2020.

*Primary Examiner* — Geoffrey S Evans
(74) *Attorney, Agent, or Firm* — Ryan Alley IP

(57) ABSTRACT

EDM assemblies mount on a machining surface and discharge rotating sub-electrodes against the surface. The sub-electrodes can also revolve about another shared axis while discharging. Rotation and revolution may be achieved with planetary gears fixed with the sub-electrodes and meshing with a stationary sun gear. Several sub-electrodes can be used in a single assembly. Downward movement of the sub-electrodes from a central shaft on the mount allows several inches of the surface to be machined. Assemblies are usable in a nuclear reactor during a maintenance period to machine a hole for a replacement manway cover underwater in the flooded reactor. The differing rotational movements and vertical movement can be independently controlled with separate motors in the assembly. Power and controls may be provided remotely through an underwater connection.

18 Claims, 4 Drawing Sheets

(56) References Cited

U.S. PATENT DOCUMENTS

| | | | | |
|---|---|---|---|---|
| 4,441,004 | A | * 4/1984 | Inoue | B23H 1/00 |
| | | | | 219/69.15 |
| 5,243,167 | A | * 9/1993 | Lundquist | B23H 11/003 |
| | | | | 219/69.12 |
| 6,233,301 | B1 | 5/2001 | Robergeau | |
| 6,261,153 | B1 | 7/2001 | Dickerson et al. | |
| 6,373,018 | B1 | * 4/2002 | Wei | B23H 7/26 |
| | | | | 219/69.11 |
| 6,797,912 | B2 | * 9/2004 | Derehag | B23H 9/10 |
| | | | | 219/69.15 |
| 9,764,404 | B2 | 9/2017 | Eckert | |
| 2003/0128794 | A1 | 7/2003 | Kurosawa et al. | |
| 2011/0266258 | A1 | * 11/2011 | Legge | B23H 9/00 |
| | | | | 219/69.15 |
| 2013/0319974 | A1 | * 12/2013 | Metzner | B23H 1/04 |
| | | | | 219/69.15 |
| 2017/0282267 | A1 | * 10/2017 | Gao | B23H 1/04 |
| 2018/0361512 | A1 | 12/2018 | Lewis et al. | |
| 2019/0143431 | A1 | * 5/2019 | Luo | B23H 7/26 |
| | | | | 219/69.15 |

FOREIGN PATENT DOCUMENTS

| | | | | |
|---|---|---|---|---|
| JP | 09218139 A | * | 8/1997 | |
| JP | 1076427 | | 3/1998 | |
| JP | 10113824 | | 5/1998 | |
| JP | 2001018125 | | 1/2001 | |
| JP | 2004077485 A | * | 3/2004 | B23H 9/00 |

\* cited by examiner

ELECTRICAL DISCHARGE MACHINING ASSEMBLIES AND METHODS FOR USING THE SAME

BACKGROUND

FIG. 1 is a perspective view of a related art rotating electrode 10 useable in electrical discharge machining (EDM). Typically, in nuclear reactor environments and other industrial settings, it is necessary to remove materials, such as by making holes, in underwater or remote structures. For example, in a nuclear reactor, a remote welded component, like a manway cover, may become damaged about its weld, and a replacement cover may need to be mechanically bolted over the same underwater. During this repair, a spotface may be electrical discharge machined in the cover to a depth of 0.05 inches to accommodate the replacement cover. EDM is generally used in such processes because it produces a fine swarth that does not interfere with reactor internals and can be executed far underwater.

Related art rotating electrode 10 may be used in a larger spotfacing assembly to EDM such a hole during a manway cover replacement or other operation. As shown in FIG. 1, rotating electrode 10 may rotate about a central axis, such as on a spindle or axle (not shown) in the assembly. Several electrode segments 11A, 11B, and 11C may each be powered through leads 12 connecting up through a brush or other non-secured connection to a powering electrode and out to segments 11A, 11B, and 11C. Individual electrodes 13 or discharge faces may thus be powered and rotated in an annular fashion across a surface to be machined. Rotating electrode 10 may be moved transversely about the desired spot, potentially underwater, as individual electrodes rotate and electrically discharge machine the surface. At various points in the operation, related art rotating electrode may be replaced as electrode segments 11A, 11B, 11C, etc. become worn, over potentially several hours of discharging away the material.

SUMMARY

Example embodiments include EDM assemblies that can be fixed to a machining surface while rotating sub-electrodes on their own axes. Thus, when discharging the sub-electrodes, a large electrode-surface interface is generated, and a larger amount of material is removed. The sub-electrodes can also revolve about a shared axis while discharging, further increasing material removal and evenness of the EDM burn. The relative motions may be achieved with planetary gears fixed with the sub-electrodes and meshing with a stationary sun gear. Several sub-electrodes can be used in a single assembly, such as six cylindrical sub-electrodes that each rotate, and the sub-electrodes may be relatively large, such as several inches in diameter.

The sub-electrodes can also move downward from a spindle on the mount and into a surface being machined, up to several inches, to create a deep hole. For example, these operations may be used in a reactor during a maintenance period to machine a hole for a replacement manway cover underwater in the flooded reactor. Rotational and vertical movement can be independently controlled with separate motors in the assembly, and power and controls may be provided remotely through an underwater connection. The installation and use of example embodiments, including the securing of an electrode to the mount, may occur underwater.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
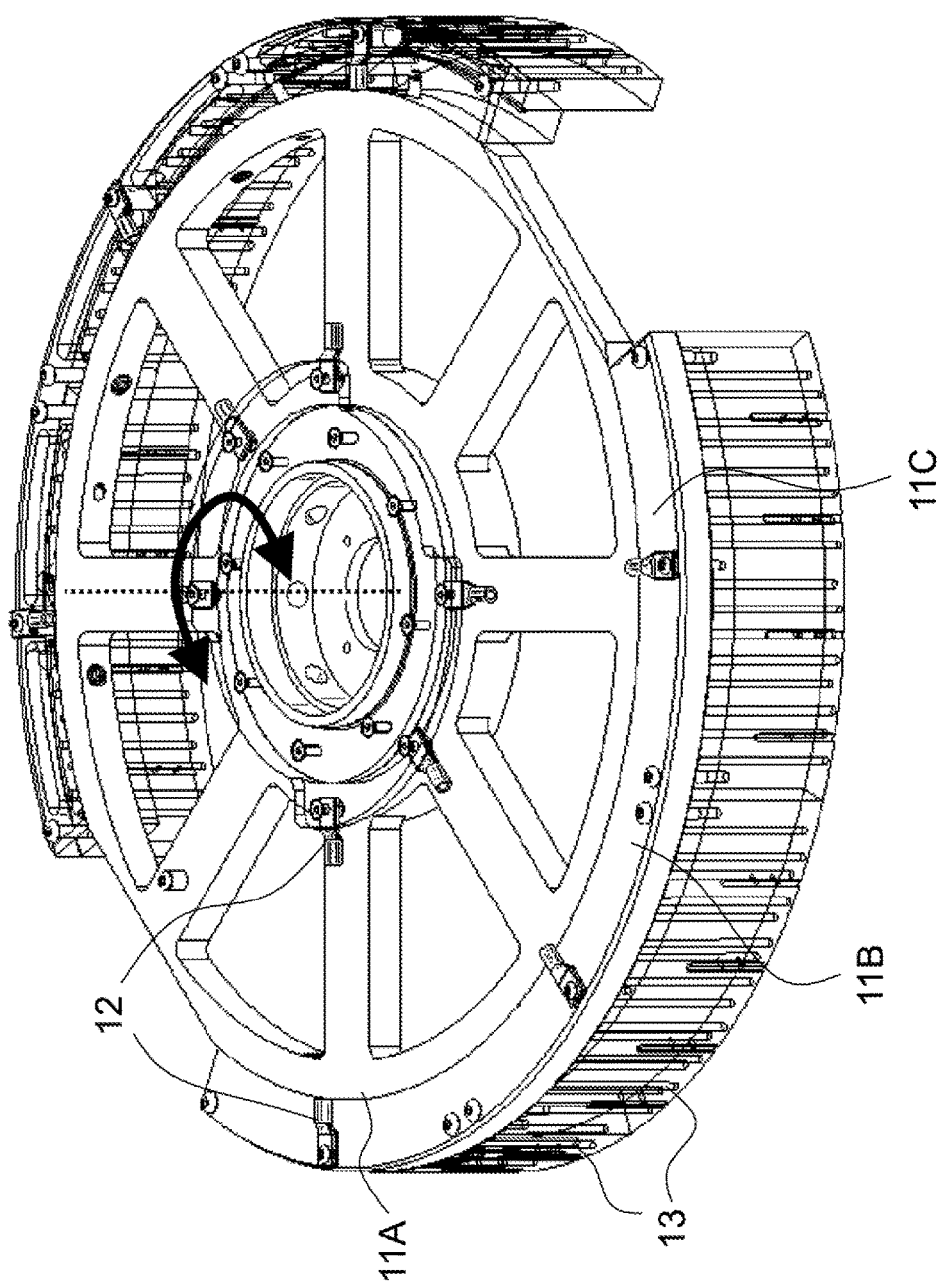
FIG. 1 is an illustration of a related art rotating electrode.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the terms "and," "or," and "and/or" include all combinations of one or more of the associated listed items unless it is clearly indicated that only a single item, subgroup of items, or all items are present. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and the are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, "axial" and "vertical" directions are the same up or down directions oriented along the major axis of a nuclear reactor, often in a direction oriented with gravity. "Transverse" directions are perpendicular to the "axial" and are side-to-side directions oriented in a single plane at a particular axial height.

The Inventors have newly recognized a need to greatly increase electrode resilience and reduce the number of electrode exchanges that may be required in heavy electrical discharge machining (EDM). Particularly, in a commercial nuclear reactor during outage periods, repairs and other operations must be executed quickly to return the plant to an operational state as soon as possible. There is also a need to produce large and deeper holes or cuts in remote environments, which only further increases wear on electrodes, especially a single, thin annular electrode as shown in FIG. 1. Example embodiments described below uniquely enable solutions to these and other problems discovered by the Inventors.

The present invention is rotatable electrodes for EDM, and assemblies and methods for using the same. In contrast to the present invention, the few example embodiments and example methods discussed below illustrate just a subset of the variety of different configurations that can be used as and/or in connection with the present invention.

Figure 2:
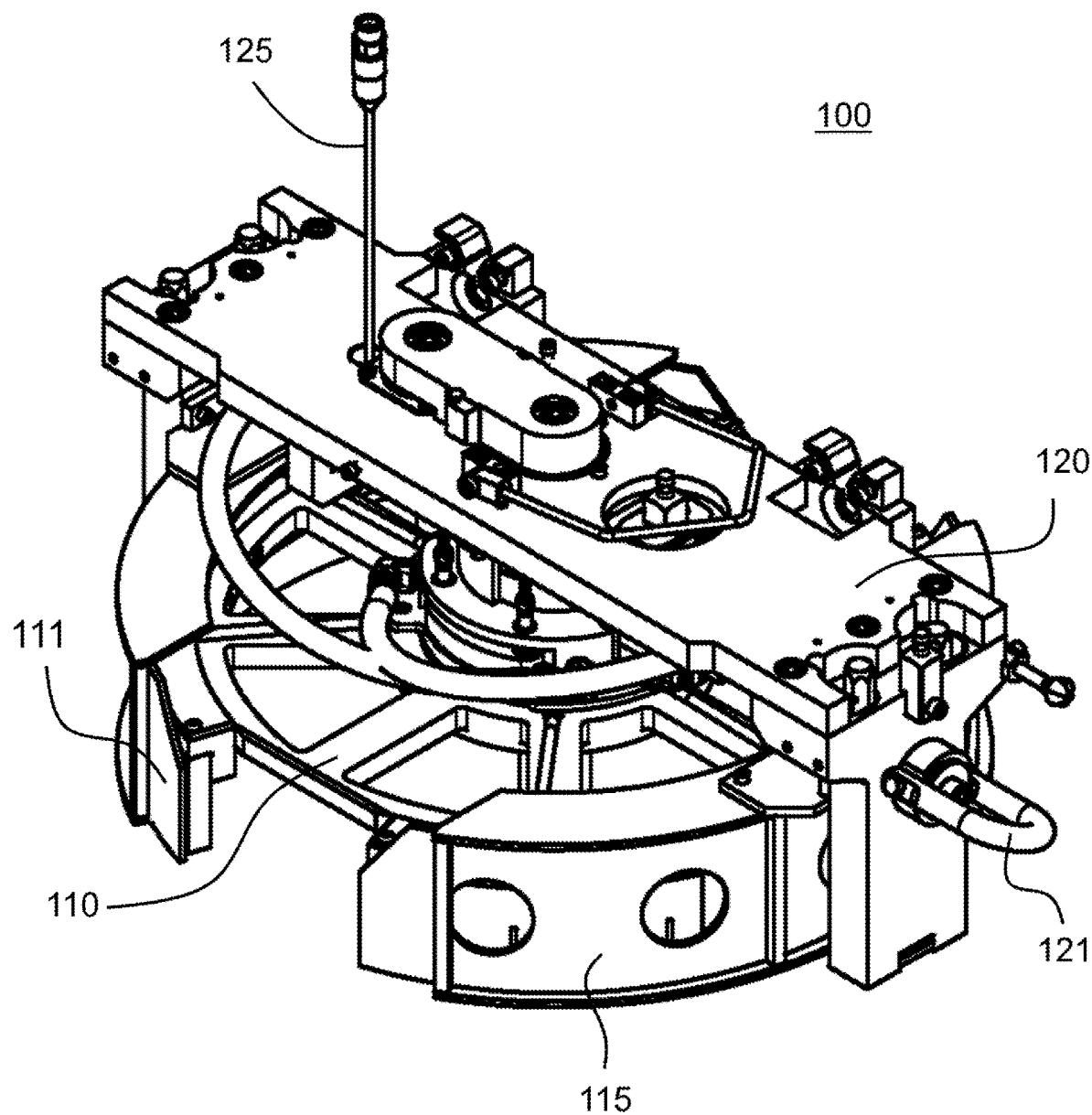
FIG. 2 is an illustration of an example embodiment electrical discharge machining assembly

FIG. 2 is an illustration of an example embodiment EDM assembly 100. As shown in FIG. 2, assembly 100 includes linear mount 120 in which electrode assembly 115 may be moveably nested. Linear mount 120 may have a bridge-like shape with legs that permit its fixture to an area for EDMing and a top portion with controls and power for moving electrode assembly 115. Linear mount 120 may be positioned by a hoist ring 121 on one or more sides of its legs or any other connection point. In this way, example embodiment EDM assembly may be positioned and secured in remote and even underwater positions, such as over a manway cover submerged in a nuclear reactor requiring repair. Umbilical port 125 may connect data, power, and/or controls to/from a remote operator from/to assembly 100, and/or any other form of communicative and power connection may be used in assembly 100.

Electrode assembly 115 includes example embodiment planetary electrode 200 (FIG. 3) moveable with respect to linear mount 120, at least in a vertical direction and rotatably on a vertical axis. Electrode assembly 115 may house planetary electrode 200 in one or more electrode guards 111 that prevent debris or foreign objects interfering with sides or top of planetary electrode 200. Insulator 110 may be positioned interior to electrode assembly 115 to prevent electrical discharge between assembly 115 and electrode 200. Alternatively, electrode assembly 115 may include only planetary electrode 200, such that electrode 200 is not largely surrounded by electrode guards 111

Figure 3:
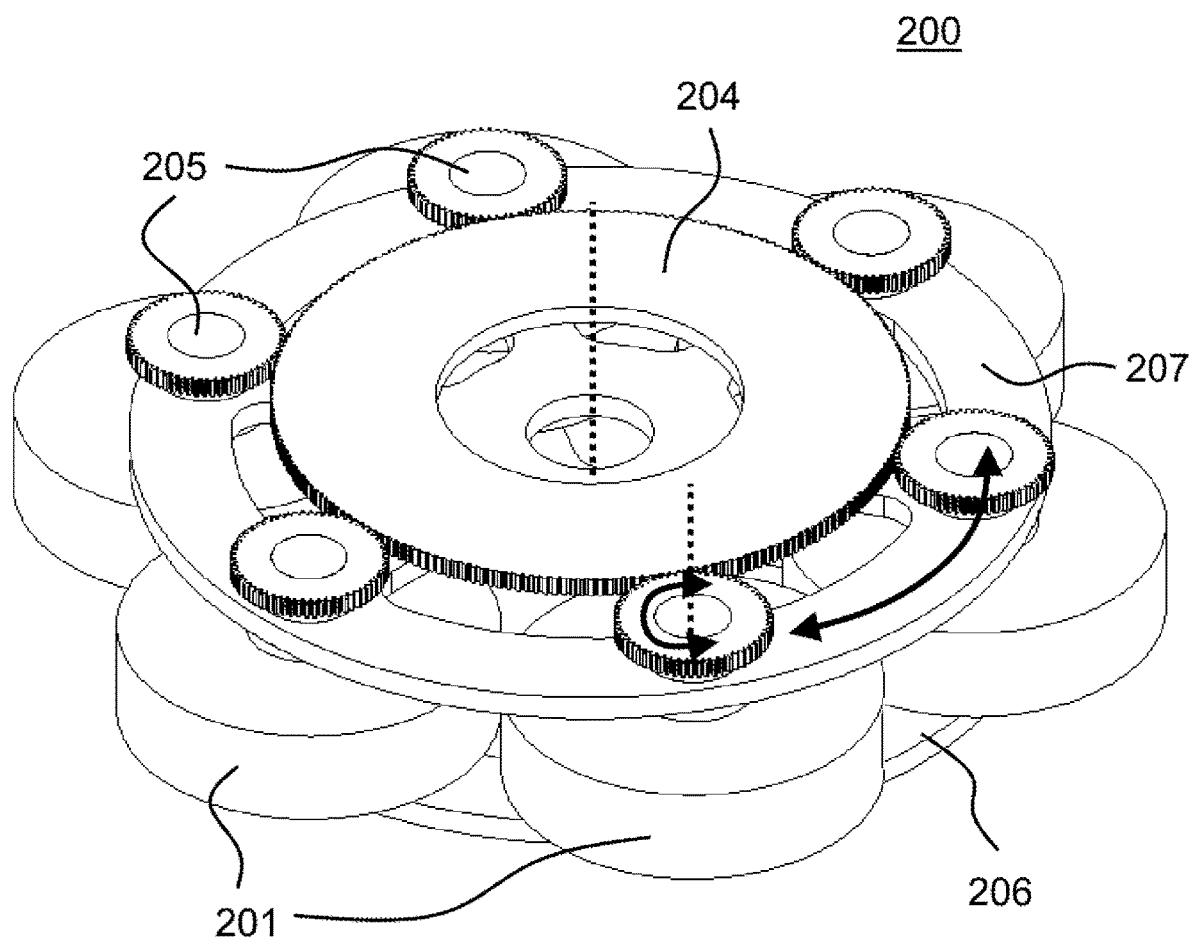
FIG. 3 is an illustration of an example embodiment planetary electrode.

FIG. 3 is an illustration of example embodiment planetary electrode 200 in isolation, although electrode 200 is useable in example embodiment EDM assembly 100 discussed above. As shown in FIG. 3, planetary electrode 200 includes several electrode bodies 201 arranged in a circular orbit; however, other orbit and electrode shapes are useable in example embodiments. Similarly, while six cylindrical electrode bodies 201 are shown in FIG. 3, any number and shape of electrode bodies may be used. Electrode bodies 201 rotate about individual vertical axes through their respective centers and also revolve about a vertical axis through a center of planetary electrode 200. These motions are shown by arrows in FIG. 3.

The combined revolutionary and rotational motion of electrode bodies 201 presents increased electrode-EDM-surface relative motion as well as more electrode surface being used in EDM, improving material removal and reducing wear on electrode bodies 201. For example, compared to related art rotating electrode 10 in FIG. 1, example embodiment planetary electrode 200 in a same spotface area may present over twice the surface area to the spotface area. As an example, electrode bodies may each be cylindrical with approximately 7-8 inch diameters and formed of graphite, silver tungsten, and/or any other EDM-appropriate material. The reminder of assembly 100 and electrode 200 may be fabricated of materials that are compatible with a nuclear reactor environment, including materials that maintain their physical characteristics when exposed to high-temperature materials and radiation, such as stainless steels and iron alloys, aluminum alloys, zirconium alloys, etc.

The revolutionary and rotational movement of electrode bodies 201 may be accomplished by fixing electrode bodies 201 on planetary gears 205 that mesh with sun gear 204. Top guide 207 and bottom guide 206 may fix electrode bodies 201 in an orbit about sun gear, and as bodies 201 revolve, planetary gears 205 meshed with sun gear 204 cause bodies 201 to rotate proportionally. Electrical power may be further provided through top guide 207 ad/or planetary gears 205 to charge electrode bodies 201 while rotating and revolving. Of course, other mechanical configurations are useable with example embodiment electrode 200 to achieve revolution and/or rotation of the same.

Figure 4:
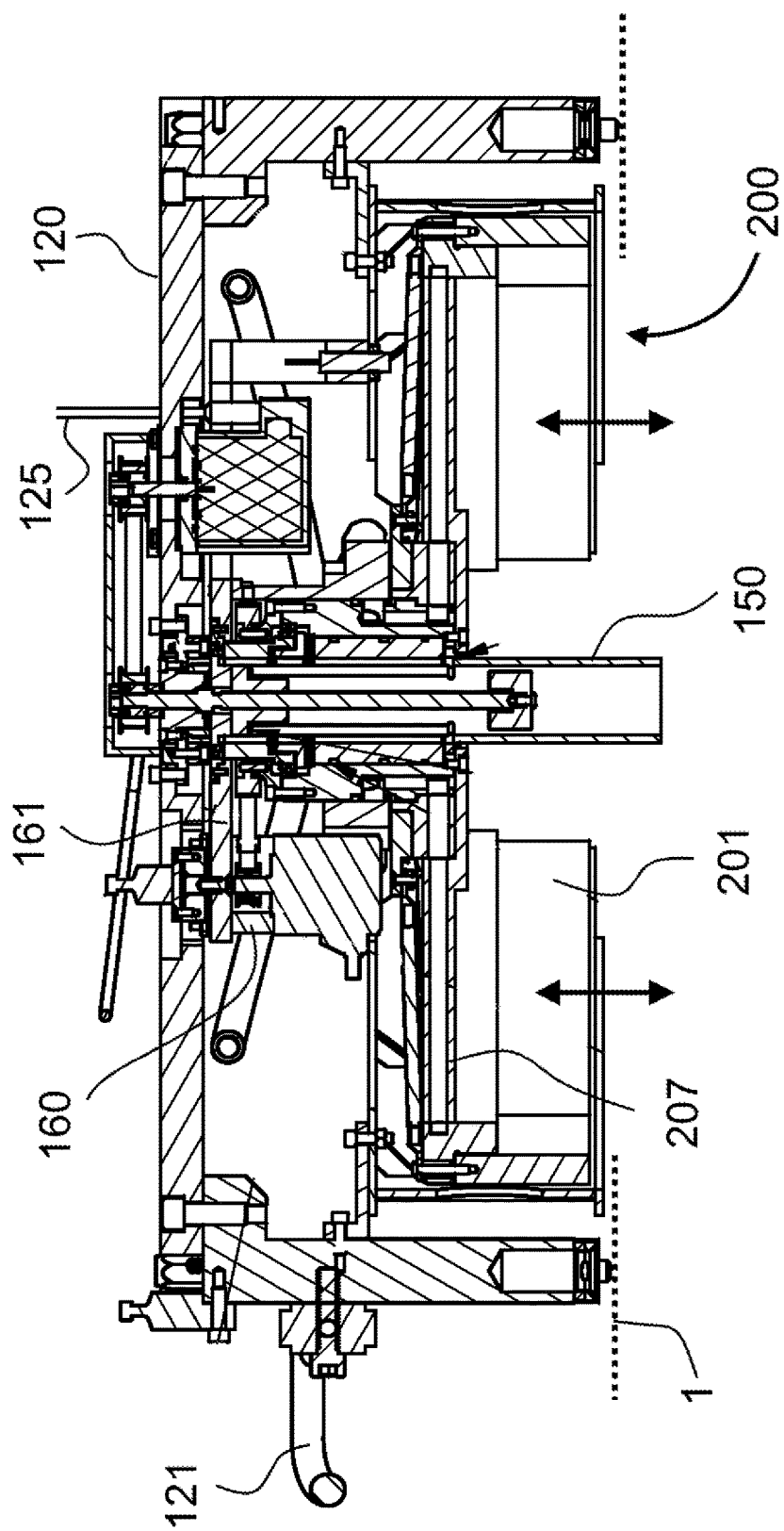
FIG. 4 is a cross-sectional schematic of the example embodiment electrical discharge machining assembly and planetary electrode.

FIG. 4 is a cross-sectional illustration of example embodiment EDM assembly 100 showing example embodiment planetary electrode 200 moveable in the same when mounted to surface 1 to be EDMed. As shown in FIG. 4, central spindle 150 connects to example embodiment planetary electrode 200 to rotate electrode 200 and move electrode 200 in a vertical direction. For example, spindle 150 may form a ball and screw connection with linear mount 120, and stepper motor 160 may rotate spindle 150 via timing belt 161 to cause the vertical displacement of spindle 150 and electrode 200 due to the ball and screw connection. Spindle 150 may connect to electrode 200 via top guide 207 or any other component of electrode 200. Top guide 207 may be rotated with a separate stepper motor 170 while sun gear 204 does not rotate, causing the revolutionary and rotational motion of electrode bodies 201.

As seen, electrode 200 may be vertically lowered against surface 1 for EDM while linear mount 120 remains stationary. The vertical depth of the EDM may be adjusted based on the application and amount of material needed to be removed. For example, a hole of several inches, such as a 1.85-inch deep spotface, may be formed with similar vertical movement of electrode 200 in example embodiment assembly 100. The increased interface area and larger wear distribution across electrode bodies 201 will remove material in the spotface up to 2.3 times faster than related art electrodes, with a reduced number of electrode changes, potentially up to half the necessary changes, due to wear. The combined faster EDMing and fewer stoppages for electrode changes are expected to speed several tasks using example embodiment EDM assembly 100, reducing downtime and allowing operations to resume faster.

Example embodiments and methods thus being described, it will be appreciated by one skilled in the art that example embodiments may be varied and substituted through routine experimentation while still falling within the scope of the following claims. For example, any number of electrodes and sizes aside from those shown can be used in example embodiment EDM assemblies, simply through proper dimensioning and positioning. Such variations are not to be regarded as departure from the scope of these claims.

What is claimed is:

1. An assembly for electrical discharge machining, comprising:
    a mount configured to secure about a surface to be machined; and
    an electrode rotatably coupled to the mount, wherein the electrode includes a plurality of electrode bodies, wherein each of the electrode bodies is configured to rotate about a vertical axis internal to a corresponding electrode body;
    a first stepper motor configured to move the electrode vertically; and
    a second stepper motor configured to rotate the electrode bodies about the vertical axis internal to a corresponding electrode body, wherein the electrode is rotatably connected to a spindle of the mount on which the electrode is vertically moveable, and wherein the first stepper motor is configured to rotate the spindle so as to cause the vertical movement through a ball-and-socket connection.

2. The assembly of claim 1, wherein the plurality of electrode bodies are further configured to all revolve about a vertical axis central to the electrode.

3. The assembly of claim 2, wherein each of the electrode bodies are fixed with a planetary gear, and wherein the electrode includes a sun gear meshed with the planetary gears.

4. The assembly of claim 1, wherein the electrode is further configured to vertically move relative to the mount.

5. The assembly of claim 4, wherein the electrode is rotatably connected to a spindle of the mount on which the electrode is vertically moveable.

6. The assembly of claim 4, wherein the plurality of electrode bodies are further configured to all revolve about a vertical axis central to the electrode.

7. The assembly of claim 6, wherein each of the electrode bodies are fixed with a planetary gear, and wherein the electrode includes a sun gear meshed with the planetary gears.

8. The assembly of claim 1, wherein the plurality of electrode bodies includes six cylindrical electrode bodies.

9. A method of electrically discharge machining a surface, the method comprising:
    securing an electrode to the surface with a mount, wherein the securing occurs underwater; and
    rotating a plurality of electrode bodies in the electrode each about a vertical axis internal to a corresponding electrode body while discharging an electrical current through the plurality of electrode bodies.

10. The method of claim 9, further comprising:
    revolving the plurality of electrode bodies about a vertical axis central to the electrode while discharging the electrical current through the plurality of electrode bodies.

11. The method of claim 10, wherein each of the electrode bodies are fixed with a planetary gear, and wherein the electrode includes a sun gear meshed with the planetary gears.

12. The method of claim 9, further comprising:
    vertically moving the electrode relative to the mount while discharging the electrical current through the plurality of electrode bodies.

13. The method of claim 12, wherein the electrode is rotatably connected to a spindle of the mount on which the electrode is vertically moveable.

14. The method of claim 9, wherein the plurality of electrode bodies includes six cylindrical electrode bodies.

15. A method of electrically discharge machining a surface, the method comprising:
    securing an electrode to the surface with a mount; and
    rotating a plurality of electrode bodies in the electrode each about a vertical axis internal to a corresponding electrode body while discharging an electrical current through the plurality of electrode bodies, wherein the surface is a manway cover in a nuclear reactor, and wherein the method is performed entirely underwater.

16. The method of claim 15, further comprising:
    vertically moving the electrode over 1.5 inches relative to the mount and into the surface while discharging the electrical current through the plurality of electrode bodies so as to remove at least 1.5 inches of the surface.

17. The method of claim 16, further comprising:
    revolving the plurality of electrode bodies about a vertical axis central to the electrode while discharging the electrical current through the plurality of electrode bodies.

18. The method of claim 15, wherein the method is performed entirely during a maintenance outage of the nuclear reactor.

* * * * *